United States Patent [19]

Trimble

[11] Patent Number: 4,613,874

[45] Date of Patent: Sep. 23, 1986

[54] MAGNETIC PRINTING

[76] Inventor: Lyne S. Trimble, 4724 Arcola Ave., North Hollywood, Calif. 91602

[21] Appl. No.: 635,529

[22] Filed: Jul. 30, 1984

[51] Int. Cl.$^4$ ............................................. G01D 15/12
[52] U.S. Cl. .................................. 346/74.6; 358/301; 360/125
[58] Field of Search .................. 346/74.5–74.7, 346/101; 430/39; 360/125; 358/301

[56] References Cited

U.S. PATENT DOCUMENTS

| | | | |
|---|---|---|---|
| 3,017,234 | 1/1962 | Trimble et al. | 346/74.6 |
| 3,512,169 | 5/1970 | Trimble | 346/74.6 |
| 3,810,191 | 5/1974 | Stauffer | 346/74.3 |
| 3,911,552 | 10/1975 | Trimble et al. | 29/458 |
| 4,414,554 | 11/1983 | Springer | 346/74.5 |

FOREIGN PATENT DOCUMENTS

196279(A) 2/1982 Japan ..................................... 430/39

*Primary Examiner*—A. Evans

[57] ABSTRACT

Improved means and method for information transfer through magnetic field pulses over an area and at electronic information flow rates consisting of establishing a bias level magnetic field just below the threshold field strength required to transfer information by means of magnetic recording, then adding to the bias field by sequentially inducing low field strength magnetic fields from high speed, low current electrical signals sweeping through an x, y solenoid matrix, the combination effecting microsecond rate magnetic recording and information transfer onto a magnetochemical surface.

The bias field is established using a suitably shaped permanent magnet material and conducting the magnetic field directly to the recording area upon a point to point basis through a sheaf of magnetic field conducting wires, the sheaf is surrounded by an external coil of electrical wire capable, with current flow, of modulating the magnet established bias field transmitted through the sheaf of wires to the base of a printed circuit board carrying the x, y distribution of tiny solenoids, each centered with a pre-oriented magnetic metal core and each core placed in contact with one of the bias magnetic field carrying wires of the sheaf, the combination operable with electronic information interfacing through high speed low current pulses inducing magnetic fields that add to the bias field and effect point to point magnetic field recording upon a magnetochemical surface placed against the surface of the solenoid.

3 Claims, 4 Drawing Figures

MAGNETIC PRINTING

BACKGROUND OF THE INVENTION

The present invention is broadly concerned with information transfer through magnetic recording and utilizing an x, y matrix of solenoids to generate magnetic pulses upon a point to point basis from programmed electrical signals said pulses resulting in the production of visible displays, and in particular displays in color, and in register, on a magnetochemical film layer.

Magnetochemistry is the utilization of magnetic field forces to trigger spontaneous chemical reactions and the background of this art is to be found prior U.S. Pat. Nos. 3,281 669, 3,512,169, 3,882,507, 3,911,552, 3,922,687 and 4,206,866.

The last four of the above referenced patents disclose and describe the structure of high sensitivity magnetochemical particles in which two, plated, pre-oriented magnetic metal spheres are joined with their directions of orientation in parallel relation, and such that, when placed in a suitable chemical environment and subjected to a magnetic field, opposing forces are generated between the spheres causing them to spring apart and thereby initiate a chemical reaction between the exposed junction of the spheres and a surrounding chemical environment. The referenced patents further teach that these triggering elements can be incorporated into colorless but color forming liquids suspended in droplet form within a resin medium, and that this resin medium containing the droplets can be coated upon a support material, and by subjecting the coated material to an appropriate magnetic field, visual patterns in color are produced.

The above mentioned U.S. Pat. No. 3,882,507 discloses and teaches the broad concept of positioning and aligning plated magnetic metal spheres so that their preferred directions of orientation for magnetic field propagation are parallel, and while so positioned abrading small surface areas of the spheres, then bonding the two spheres together to provide discrete pairs of such tiny magnetic metal spheres as illustrated by FIGS. 2, 3, 4 and 5 of the patent.

U.S. Pat. No. 4,206,866 describes an improvement and a simplification of the previously known technique for preparing joined pairs of demagnetized magnetic metal spheres as disclosed and described in U.S. Pat. No. 3,882,507; and whereby it is possible to prepare such joined pairs of spheres on a continuous mass production basis.

There are several magnetic field sources useful in exposing, recording, printing, writing or otherwise transferring magnetic information to become visible upon the magnetochemical surface including permanent magnets, magnetic recording heads, magnetic field concentrating helix sweeping over a magnetizable electromagnet bar, solenoids, directionally oriented magnetic tape and others known in the art and described in U.S. Pat. No. 3,882,507 and in particular column 12, lines 46 through 68; column 13, lines 1 through 68; and column 14, lines 1 and 2.

The state of the art direct recording techniques, require mechanical motion and introduce primary color image registration problems in transferring magnetic field information to a surface, as in page writing or printing, either in creating the interface or in frictional exposure to a magnetic field generating instrument.

SUMMARY OF THE INVENTION

The present invention eliminates all mechanical and frictional motion in magnetic field exposure to generate in register a full color pictorial quality reproduction at micro second electrical signal flow rates, except for the placement and removal of the magnetochemical paper, and this can be implemented by spring loading a paper pack so that it is only necessary to remove the exposed magnetochemical paper to permit the spring loading to establish the interface for a succeeding exposure. If the magnetochemical paper is in roll or fan fold form then conventional paper moving devices can be employed to permit either continuous writing or printing on a rapid succession of still prints.

The invention is an improvement of the technique disclosed in U.S. Pat. No. 3,911,552, column 13, lines 11 through 14 and stating: "Printing techniques devoid of mechanical motion include an x, y matrix of tiny solenoids, where printing occurs on a point to point basis through programmed electrical signals", and lines 33 through 37 stating: "With a magnetic field bias applied to the solenoids, mild excursions of current will effect writing on a point-to-point basis upon a film embodying the invention and placed against the matrix surface".

With the need to link magnetochemical visible image formation to an electrical signal in a straight-forward fashion and accept electrical signals from electronic photography there is need for refinement of the above referenced technique. The magnetic field strength generated by a solenoid depends upon the number of ampere turns of wire available. On compact point to point spacing to achieve high resolution in a transfer of information, the solenoids of necessity have limited turns of very small diameter conducting wire. Compensation through increasing the current, although helpful at low writing rates, is not feasible at high writing rates. Use of a core in the solenoid is helpful, however, the permeability, representing the increase in induced magnetic field in a core material with increase in applied magnetizing force, is not a fixed quantity but depends upon the magnetic flux density at which the core material is operated. At low solenoid current flow levels, the core permeability is low and the combination provides a correspondingly low magnetic field.

Thus the present invention is an improvement of previously known techniques for writing, printing or otherwise transferring information by means of magnetic field pulses upon a point to point basis along a line or over an area in response to programmed electrical signals, so that visible displays in color are provided at high speeds, devoid of mechanical motion, and with primary colors in full registration.

Objects of the present invention include:

(a) The provision of an x, y matrix of tiny solenoids on a thin surface carrier, the solenoids comprising flat coils, each centered with a pre-oriented magnetic metal sphere that has been heat treated and annealed in a magnetic field, and each coil being actuated by programmed electrical signals.

(b) Provision for making tiny multiple turn coils by circuit board techniques such that there are at least 200 coils per linear inch in the x and in the y direction over the surface, each coil centered with a magnetic metal core and the coils so interconnected that each coil can be selectively actuated to generate a magnetic field at its center as the result of x, y programmed electrical signals.

(c) Provision for making the center of each solenoid devoid of conducting material so that a pre-oriented magnetic metal sphere can be placed in this center position and magnetically aligned so that the preferred direction of orientation of the pre-oriented magnetic metal sphere is perpendicular to the surface of the circuit board and parallel to the magnetic field generated at the center of the solenoid by electrical current flow through the solenoid.

(d) Provision for bonding the pre-oriented magnetic metal spheres centered in their respective solenoid coils without changing their pre-oriented directions.

(e) Provision for flattening the top surfaces of the pre-oriented magnetic metal spheres without changing the positions of the spheres or their orientation to a magnetic field and establishing thereby the diameter of these recording points as well as insuring that the entire surface of the circuit board is flat.

(f) Provision for establishing a uniform strength of magnetic field over an area equal to that of the circuit board by means of a suitably shaped directionally oriented permanent magnet material.

(g) Provision for concentrating the permanent magnet magnetic field upon a point to point basis and conducting this field uniformly to the thin base of the circuit board by means of a sheaf of tiny magnetic field conducting wires suitably mounted above the magnet and potted so that one end of each wire contacts an area on the magnet while the other end makes contact with the reverse side of the circuit board and in particular with a pre-oriented magnetic metal sphere on the circuit board.

(h) Provision for increasing or decreasing the magnetic field transmitted through the tiny wires to the pre-oriented magnetic metal spheres by means of an external coil of moderate diameter electrical conducting wire surrounding the sheaf of tiny magnetic field conducting wires, said coil capable of accepting current flow in either direction through the coil and thereby enhancing or opposing the magnetic field in the wires established by the uniform strength magnetic field from the suitably shaped permanent magnetic material.

(i) Provision for assembling the suitably shaped permanent magnet material, the sheaf of conductive wires topped by the x, y circuit board, and above and on top of the circuit board a thin layer of perpendicularly oriented magnetic metal or magnetic oxide recording tape, said tape having at least 200 transversally magnetized areas per linear inch in the x and y directions said areas magnetized to a level just below that necessary to actuate the joined pairs of magnetic metal spheres contained in a magnetochemical film placed against the magnetic field sensitive surface of the transversally magnetized magnetic tape layer.

(j) Provision for magnetizing said thin layer of magnetic recording tape by means of magnetic field generated within the above-described assembly, such that there is a transversally magnetized area directly over each sphere and each magnetic field conducting wire in the sheaf of tiny magnetic field conducting wires leading to the spheres.

(k) Provision for selecting the x, y matrix solenoid spacing and the transversally magnetized areas of the magnetic recording tape so that they cooperatively respond to establish the point to point resolution and diameter of the tiny areas of information recorded upon the magnetochemical layer coincident with programmed electrical signals to selectively expose, and thus trigger the formation of, visual patterns in color within the magnetochemical film layer.

(l) Provision for electrical signal controls to cooperatively establish the magnetic field transmitted through the sheaf of wires, then the current flow through the solenoids, said controls responding to programmed commands for recording or writing one, two or all three of the primary colors suitable for full color reproduction upon the magnetochemical layer.

(m) Provision for utilizing this unique and unusual technique to achieve primary color registration and to generate full color pictorial quality reproduction at electrical signal flow rates.

(n) Provision for accomplishing the above objectives devoid of any frictional or mechanical motion except for the placement and removal of the magnetochemical film and its base support material.

(o) Provision for accomplishing the above objectives devoid of the pre-oriented magnetic metal spheres, said spheres being replaced by a projection of each tiny magnetic field conducting wire through holes in the circuit board, each hole centered in a solenoid on the circuit board.

Further objects and advantages of the invention will be brought out in the following part of the specification wherein detailed description is for the purpose of fully disclosing the embodiment of the invention without placing limitations thereon.

DESCRIPTION OF THE PREFERRED EMBODIMENT

Figure 1:
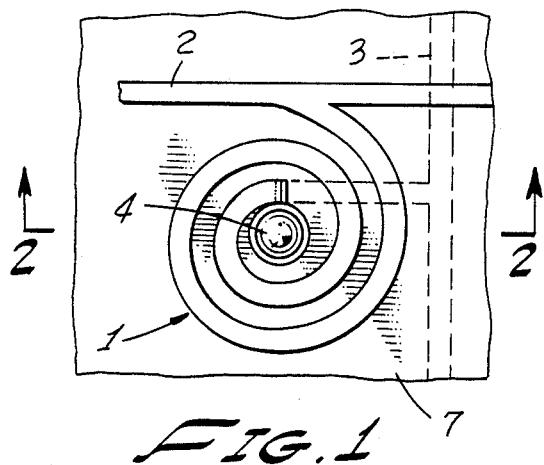
FIG. 1 is an enlarged top view of a single solenoid coil on the surface of a thin printed circuit board such as utilized in accordance with the present invention.
Figure 2:
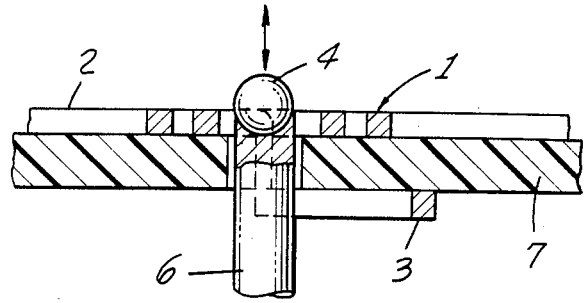
FIG. 2 is an enlarged cross-section view taken substantially on line 2—2 of FIG. 1, showing a directionally oriented magnetic metal sphere positioned in accordance with the present invention.

Referring more specifically to the drawings, there is shown in FIG. 1 a plane surface coil of a conductor 1, prepared by printed circuit techniques and capable of accepting current flow from either of the x, y inputs, 2 and 3, to generate a magnetic field having maximum strength at the center of the coil and a field direction perpendicular to the plane surface as shown in FIG. 2.

Figure 3:
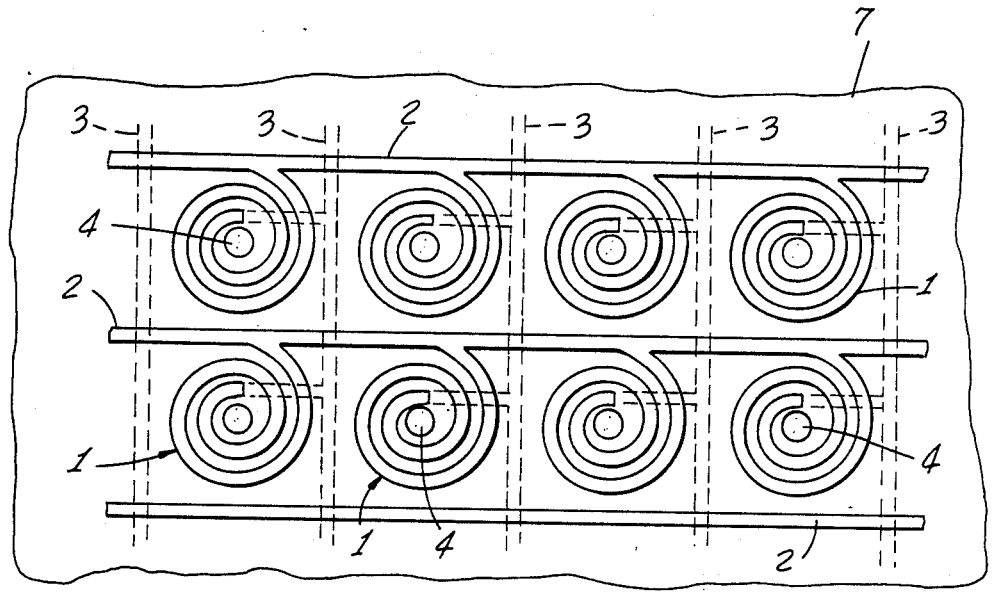
FIG. 3 is an enlarged view of a portion of the surface of the circuit board showing solenoid coil interconnections in accordance with the present invention.

The coil diameter and the number of turns of conductor comprising the coil depends upon the width of the conducting ribbon and the spacing between conductors in the spiral path. The state of the art permits coil packing density sufficient to provide well over 200 coils per linear inch to achieve 200 recording points per linear inch in both the x and y direction in the manner of FIG. 3. This packing density is not a limiting factor in the invention but it is a convenient number commensurate with the associated components to be discussed below.

FIG. 2 shows a cross-sectional view of a two turn coil 1, upon a substratum. The coil conductor can be copper, silver, gold or any low resistance material readily etched to provide coils, each capable of generating a magnetic field that becomes concentrated in the directionally oriented magnetic metal sphere 4, located at the center of the coil.

There are a number of magnetic materials that can be pre-oriented with respect to magnetic field direction by heat treating and annealing in a magnetic field and will serve this purpose. Good performance has been obtained using directionally oriented Alnico 5 metal as well as directionally oriented Vicallay metal (U.S. Pat. No. 3,882,507, column 4, lines 26 through 36). These materials in the form of 0.0005 to 0.002 inch (0.00127 to 0.00508 centimeter) diameter spheres have been found to exhibit a 4 to 5 fold increase in a unitary magnetic flux induced along the oriented direction, indicated by the arrow in 4 of FIG. 2, as compared to the 0.1 fold flux increase induced in spheres that have not been heat treated and annealed in a magnetic field.

The demagnetized spheres are distributed over the surface of the printed and etched circuit board and lightly brushed into tiny holes at the center of each coil. Essentially the same technique can be utilized as described in the above referenced U.S. patents and in particular U.S. Pat. No. 4,206,866, column 6, lines 45 through 68. Inspection under a binocular microscope reveals any unfilled holes and these holes can quickly be seated with spheres.

A thin fluid resin with an expoy (Devon) or acrylic base (Rohm & Haas) as described in U.S. Pat. No. 4,206,866, column 7, lines 9 through 34, is applied over the surface of the circuit board and sphere assembly placed upon a large area but relatively weak magnet providing a field to hold the spheres in position. When the resin has been applied, a second and matching large area but relatively weak magnet is placed at a distance above the circuit board such that the magnetic field passing perpendicular to the circuit board surface causes the metal spheres to rotate within the fluid resin bringing their preferred directions of orientation parallel to each other and perpendicular to the circuit board surface.

When the resin has hardened the magnetic pole pieces are removed, the circuit board and spheres are subjected to magnetic field erasure, then the resin surface is machined to insure flatness and to expose the surfaces of the spheres. If relatively large recording or writing points are desired, a larger portion of the spherical surface is removed by surface machining or a sanding operation as described in the referenced U.S. Pat. No. 4,206,866.

Figure 4:
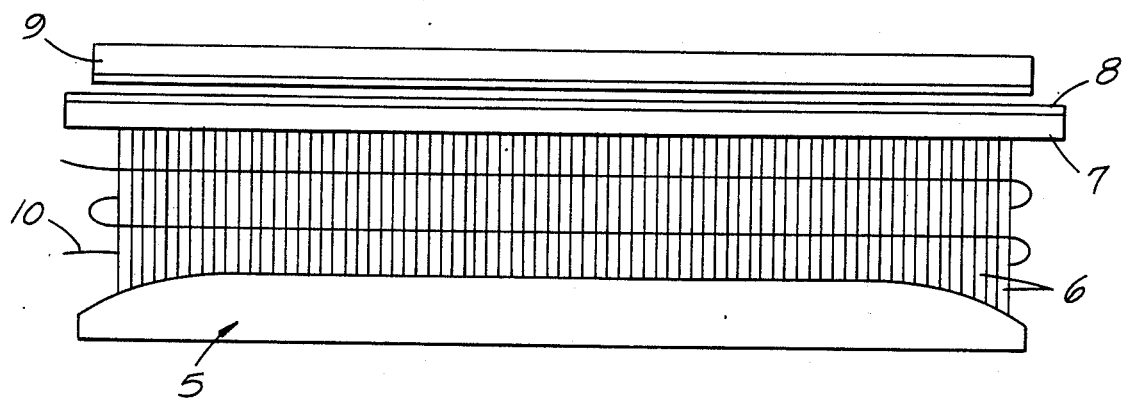
FIG. 4 is a side view of the writing or recording assembly diagrammatically illustrating the several components in functioning position in accordance with the present invention.

Referring to FIG. 4, which shows of the writing assembly, 5 is a magnetic field source, 6 represents the magnetic field conductors, 7 is the circuit board of pre-oriented magnetic metal spheres as centers for x, y actuated flat solenoids, 8 is a thin magnetic recording tape, 9 is the unexposed magnetochemical layer, and 10 is an external coil of wire surrounding the central portion of the writing assembly.

There are a number of uniform magnetic field sources that can serve the purposes of 5, and it has been convenient to use a thin light weight, magnetic field oriented plastoid magnet slightly curved at the edges to compensate for the tendency of the magnetic flux to concentrate at sharp edges of a magnetic material. The magnetic field orientation of the magnet is perpendicular to the flat surface of the magnet.

With this above described configuration, the magnetic field conductors, 6, of FIG. 4 show uniform flux levels at the spheres in the circuit board position 7. Although several magnetic materials will serve to conduct the magnetic field from 5 to 7 such that magnetic fields in air from 5 show limited strength at the level of 7, it has been convenient to use iron, either in the form of a sheaf of tiny iron wires or in electroplated form to achieve the goal of point to point magnetic field strength at a short distance, for example, one-half to three-quarters of an inch from the magnetic field source 5. In addition, the iron readily responds to fluctuations in current sent through the external coil 10 to override the base field from 5 as measured at sphere position 7 of said FIG. 4.

To insure alignment of the magnetic field conducting wires and the solenoid centers, a thin circuit board base material is prepared having holes through the base material to register with the center of each solenoid on the circuit board 7 of FIG. 4. The iron wires can be threaded through the holes from a master tool prior to potting the plastoid magnet, sheaf of wires and the under side of said thin circuit board base material.

The thin magnetic recording tape layer shown at 8 can be a conventional, transverally oriented magnetic recording metal or metal oxide layer supported upon a thin dimensionally stable base and mounted in a position of registration with the circuit board surface. It has been found that transversally magnetic field recorded areas of a magnetic tape recording material will allow propogation of a uniform magnetic field in comparison with non-transversally recorded areas of the magnetic tape and thus become windows for transmitting relatively low strength magnetic fields. These windows are helpful in controlling the diameter of the point to point recording upon the magnetochemical surface. The extent of perpendicular recording should be near saturation to insure efficiency of the recorded areas in transmitting the bias field and the addition to this field whenever a solenoid coil is pulsed.

For best results it is desirable to pre-record the transversely oriented magnetic recording layer by positioning it with the base against the solenoid surfaces then covering the recording surface with a flat iron shim stock. A magnetic pulse of reasonable strength from current in the external coil 10, of FIG. 4 will result in perpendicular recording of the recording layer areas just above the solenoid cores. The iron shim stock serves to attract the magnetic recording field propagated from the solenoid core surface, and help to complete the magnetic circuit and effect recording.

Following perpendicular recording of the magnetic recording layer, the iron shim stock is removed, the carefully registered recording layer is removed and the circuit board portion of the assembly subjected to magnetic field erasure to reduce the residual field in the spheres to that established by the permanent magnet 5, and the magnetic field conductors 6. The recorded layer can be replaced being certain that the circuit board and the magnetic recording layer are together in register. A very dilute and thin coating of a pressure sensitive adhesive applied to the dimensionally stable base of the recording layer just before reassembly is helpful in maintaining register and contact.

Performance can be calibrated by means of magnetochemical films of different threshold levels in respect to magnetic field sensitivity. It has been found that if a moderate strength magnetic field, for example 500 oersteds, is established at the ends of the conductors 6, in contact with the spheres 4, said spheres will propagate this magnetic field into the magnetic oxide layer 8, and through the perpendicularly recorded areas of this layer, now windows for passing a magnetic field in comparison with the non-recorded areas of said magnetic oxide layer 8, to cause magnetic field exposure of and thereby writing upon the magnetochemical surface at 9, that in turn causes formation of a visible pattern within the magnetochemical layer. Since the recording upon this layer is transverse, the efficiency can be improved by placing a magnetic metal shim stock or thin plate of iron against the back of the magnetochemical film support to attract the recording field and aid in completing the magnetic field flux path.

If the bias or standing magnetic field strength established at the ends of the conductors is just below the threshold necessary to cause writing upon the magnetochemical surface 9, for example 140 oersteds (gauss), a microsecond pulse of a low current sent through an individual coil, FIG. 1, and capable of inducing a one oersted (gauss) magnetic field in air at the coil center will, with a pre-oriented and aligned magnetic metal sphere centered in the coil, provide a measurable magnetic field strength of five to six oersteds (gauss). This addition to the 140 oersted (gauss) bias field is sufficient to permit recording or writing upon a magnetochemical surface positioned upon the above described assembly. It would be desirable to use larger current flow but microsecond rate pulses are not feasible at the ampere level because of incremental inductance and heat generated in the very tiny conducting wires of the solenoid coils.

Although this triggering capability is suitable for relatively small oersted (gauss) level excursions to cause writing upon the magnetochemical surface, it is sometimes desirable to increase the excursion range from high speed low current signals. This has been found possible by the substitution of a sphere of pure iron (99.5%) for Alnico 5 and Vicalloy hard magnetic materials. In this case the virgin magnetization curve for pure iron, different from that of the hard magnetic materials, advances from the toe characteristic to the high permeability (B/H) characteristic at low magnetizing field strengths so that the added measurable field strength with a one oersted (gauss) induction in air is increased to ten to twelve oersteds (gauss). The efficiency can be increased by conventional heat treating and annealing of the pure iron.

A less efficient but useful effect results from replacing the spheres with a projection of each tiny magnetic field conducting wire of the sheaf of wires through holes in the circuit board, each hole centered in a tiny multiple turn coil on the circuit board surface.

Although the description of the invention has cited Alnico 5 and Vicalloy materials as applicable cores for the relatively low level excursion of a magnetic pulse, it is to be understood that there are many other hard or permanent magnetic materials that can perform this same function. Similarly, although the description of the invention has cited pure iron as applicable for cores to achieve a relatively higher level excursion of a magnetic pulse based upon high permeability at relatively low field strengths, it is to be understood that other soft magnetic materials such as ingot iron or annealed (15% silicon), or armature grade iron (0.5% silicon) and the like having the characteristic of high permeability at relatively low magnetic field strengths can perform this same function.

The sphere configuration has been utilized because it is practical to prepare these magnetic materials in spherical form. As discussed in the referenced U.S. Pat. No. 3,882,507 and in particular column 1, lines 43 through 48, rods or square post shaped particles would lend themselves to greater efficiency of operation.

The adaptation of from one to four turn coils of wire represents the current state of the art, generally known as printed circuit board technology, in providing 200 coils per linear inch in both the x and y directions. As the state of the art advances so will the number of turns of wire per coil and the coil packing density, both acting to improve the transfer of information and resolution in terms of lines per inch that can be written or recorded upon the magnetochemical surface.

Although the application of the invention has been directed toward writing upon a magnetochemical surface, it will be understood that this transfer of information in magnetic field form can be utilized to write or record upon any magnetic field sensitive surface by means devoid of mechanical or frictional motion and at microsecond rates through establishment and control of the permanent magnet material 5, in FIG. 4 and the current level established in the coil 10 of said FIG. 4.

It will be evident from the foregoing that the within described invention when coupled with the magnetochemical development described in the background of the invention, and in particular U.S. Pat. No. 3,512,169 as illustrated by FIG. 7 in said patent, makes possible, for example, the creation of three color hard or transparency copy directly and instantly from electronic photography signals by linking the full color hard copy system to high speed electrical signals in a straight forward fashion. A lead pulse for each primary color information flow actuates the external coil around the sheaf of wires to establish the standing bias field associated with a primary color. This is followed by the stream of electrical signals actuating the solenoids and inducing relatively weak magnetic fields wherever the primary color is to be formed so that magnetic field summation causes primary color formation within one of the three magnetochemical primary color forming centers in the magnetochemical film. The two remaining primary color forming centers are sequentially actuated in the same manner. Since there is no physical motion occurring within the recording apparatus or between the solenoid surfaces and the magnetochemical film, complete physical registration of sequentially recorded primary color images is assured.

It is the means of achieving this unique triggering activity, resulting from microsecond pulses of low milliampere current levels applied to tiny solenoid coils at microsecond rates each coil having a limited number of turns of wire and each having a pre-oriented and orientation aligned magnetic metal core, the combination permitting more than the expected increase in propagated magnetic field strength said increase sufficient to augment a bias magnetic field by addition thereto to permit recording or writing upon a magnetochemical surface at microsecond rates by a technique devoid of both color image registration problems and mechanical and/or frictional motion, that are considered to be the inventions.

From the foregoing description, the use, advantages and operation of the present invention will be rapidly understood to those skilled in the art to which the application appertains. While certain forms of the invention have been described, which are now considered to be the best embodiments thereof, it is to be understood that the forms shown are merely illustrative and that the invention is not to be limited to the details disclosed herein, but is to be accorded the full scope of the appended claims.

I claim:

1. An apparatus for producing visible patterns in a magnetochemical film which includes in combination:

an x, y matrix of solenoids covering a surface, each solenoid comprising an electrical conductive coil containing a centered, directionally oriented magnetic metal sphere core, the solenoids so interconnected that each can be selectively actuated through x, y electrical connections, microsecond rate electrical signals actuating the solenoids to induce small magnetic fields that add to an established magnetic field, and the combined magnetic fields causing point to point recording upon a magnetochemical surface placed against the solenoid matrix surface.

2. An apparatus according to claim 1, in which:

each of the metal sphere cores is positioned at an end of one of a sheaf of magnetic field conducting wires.

3. An apparatus for producing visible patterns in a magnetochemical film, comprising:

a solenoid matrix having equally spaced conductive coils, each of said solenoids having a coil of at least two turns of an electrical conductor and being selectively energizable through x, y terminal electrical connections, said solenoids having magnetic metal cores including spheres of uniform size which have been heat treated and annealed in a magnetic field and magnetically aligned to have a preferred magnetic field orientation perpendicular to the solenoid matrix surface, the cores are bonded in position without changing their preferred directions of magnetic field orientation, the tops of the spheres are machined to establish flat surfaces to achieve optimum core surface areas for propagating spaced apart point-to-point magnetic fields;

a suitably shaped permanent magnet provides a uniform magnetic field perpendicular to the flat surfaces of said core spheres;

means including a sheaf of magnetic field conducting wires uniformly distributes the permanent magnetic field to the core spheres; and an external coild of electrical conducting wire surrounds the sheaf of magnetic field conducting wires, said coil being energizable to magnetically modulate the permanent magnetic field in the magnetic field conducting wires.

* * * * *